United States Patent
Razzell et al.

(10) Patent No.: US 9,528,443 B2
(45) Date of Patent: Dec. 27, 2016

(54) EFFUSION COOLED SHROUD SEGMENT WITH AN ABRADABLE SYSTEM

(71) Applicant: ROLLS-ROYCE PLC, London (GB)

(72) Inventors: Anthony Gordon Razzell, Derby (GB); Adrian Lewis Harding, Derby (GB)

(73) Assignee: ROLLS-ROYCE plc, London (GB)

( * ) Notice: Subject to any disclaimer, the term of this patent is extended or adjusted under 35 U.S.C. 154(b) by 804 days.

(21) Appl. No.: 13/792,750

(22) Filed: Mar. 11, 2013

(65) Prior Publication Data
US 2013/0255278 A1 Oct. 3, 2013

(30) Foreign Application Priority Data
Mar. 30, 2012 (GB) .................................. 1205663.6

(51) Int. Cl.
*F02C 7/12* (2006.01)
*F01D 11/12* (2006.01)

(52) U.S. Cl.
CPC ............... *F02C 7/12* (2013.01); *F01D 11/122* (2013.01); *F05D 2230/90* (2013.01); *F05D 2240/11* (2013.01); *F05D 2300/134* (2013.01)

(58) Field of Classification Search
CPC ....... F01D 11/001; F01D 11/02; F01D 11/122; F02C 7/12; F05D 2230/90; F05D 2240/11; F05D 2300/134
See application file for complete search history.

(56) References Cited

U.S. PATENT DOCUMENTS

| | | | |
|---|---|---|---|
| 4,299,865 A * | 11/1981 | Clingman | F01D 11/122 427/243 |
| 4,402,515 A | 9/1983 | Malott | |
| 4,650,394 A * | 3/1987 | Weidner | F01D 11/08 415/115 |
| 5,649,806 A * | 7/1997 | Scricca | F01D 11/08 415/115 |
| 6,155,778 A | 12/2000 | Lee et al. | |
| 6,203,021 B1 | 3/2001 | Wolfla et al. | |
| 7,704,039 B1 | 4/2010 | Liang | |
| 9,216,491 B2 * | 12/2015 | Bunker | F01D 5/186 |
| 2008/0166225 A1 | 7/2008 | Strangman et al. | |
| 2011/0255990 A1 | 10/2011 | Diamond et al. | |
| 2012/0057961 A1 * | 3/2012 | Tibbott | F01D 11/122 415/115 |

FOREIGN PATENT DOCUMENTS

| | | |
|---|---|---|
| GB | 2 009 329 A | 6/1979 |
| GB | 2 311 567 A | 10/1997 |
| JP | A-2008-309051 | 12/2008 |

OTHER PUBLICATIONS

Search Report issued in British Patent Application No. 1205663 6 dated Jul. 18, 2012.

* cited by examiner

*Primary Examiner* — Mary A Davis
(74) *Attorney, Agent, or Firm* — Oliff PLC

(57) ABSTRACT

A turbine casing assembly, comprising an annular seal segment assembly for surrounding the turbine adjacent to the turbine blades. An abradable coating is provided on the inboard surface of the seal segments of the assembly and one or more coolant ducts extend from the outboard surface of the seal segment assembly through respective seal segments and the abradable coating, for carrying a coolant towards the blade tips. One or more annular grooves are formed in the inboard surface of the abradable coating, the or each coolant duct opening into one of the one or more annular grooves.

17 Claims, 5 Drawing Sheets

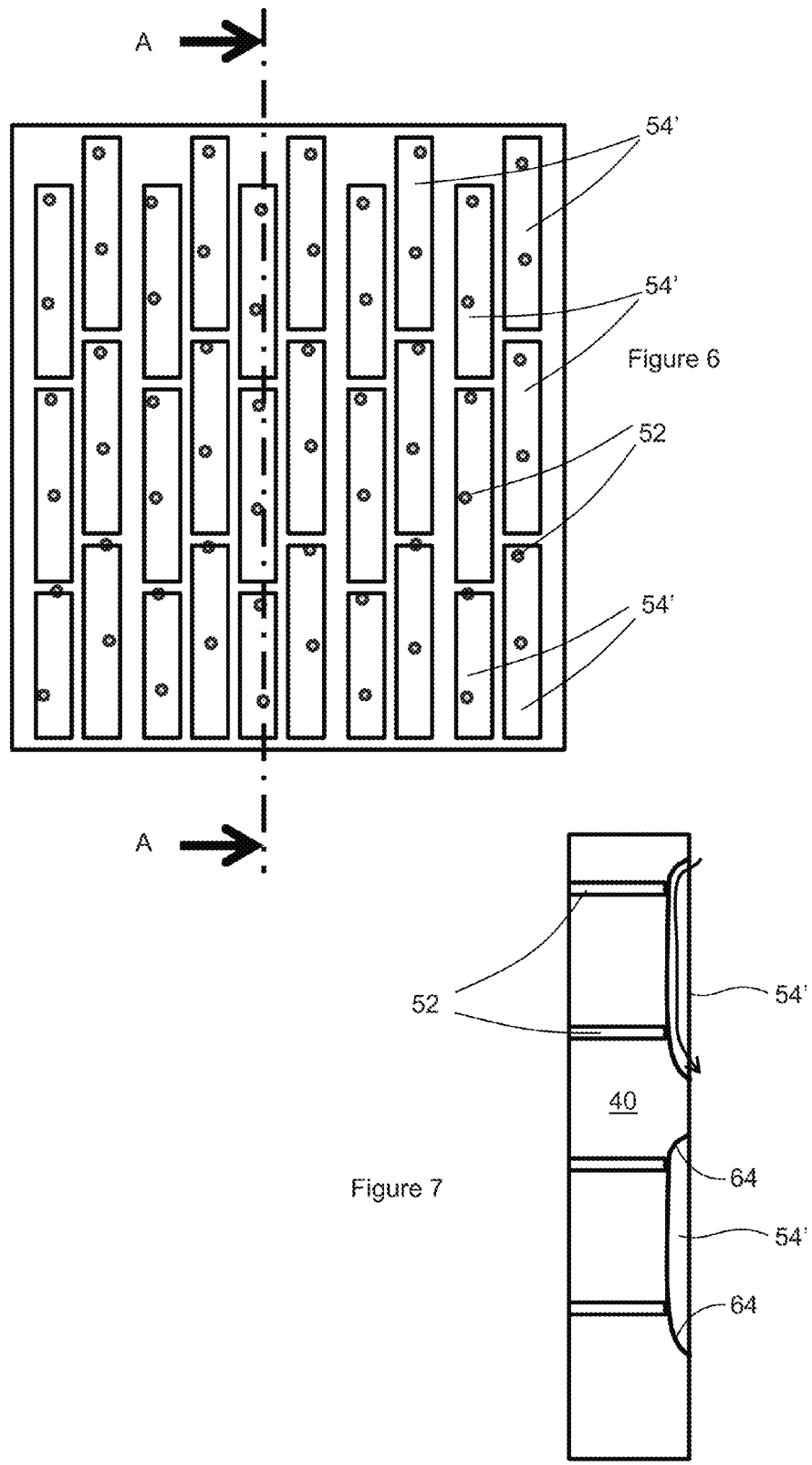

EFFUSION COOLED SHROUD SEGMENT WITH AN ABRADABLE SYSTEM

FIELD OF THE INVENTION

The present invention relates to effusion cooling of seal segments within a gas turbine engine.

BACKGROUND OF THE INVENTION

Modern gas turbine engines, and more specifically turbofans for use in aviation, provide power by compressing air using a compressor, adding fuel to this compressed air, combusting this mixture such that it expands through the blades of a turbine and exhausting the produced gases.

With reference to FIG. 1, a ducted fan gas turbine engine generally indicated at 10 has a principal and rotational axis X-X. The engine comprises, in axial flow series, an air intake 11, a propulsive fan 12, an intermediate pressure compressor 13, a high-pressure compressor 14, combustion equipment 15, a high-pressure turbine 16, and intermediate pressure turbine 17, a low-pressure turbine 18 and a core engine exhaust nozzle 19. A nacelle 21 generally surrounds the engine 10 and defines the intake 11, a bypass duct 22 and a bypass exhaust nozzle 23.

The gas turbine engine 10 works in a conventional manner so that air entering the intake 11 is accelerated by the fan 12 to produce two air flows: a first air flow A into the intermediate pressure compressor 13 and a second air flow B which passes through the bypass duct 22 to provide propulsive thrust. The intermediate pressure compressor 13 compresses the air flow A directed into it before delivering that air to the high pressure compressor 14 where further compression takes place.

The compressed air exhausted from the high-pressure compressor 14 is directed into the combustion equipment 15 where it is mixed with fuel and the mixture combusted. The resultant hot combustion products then expand through, and thereby drive the high, intermediate and low-pressure turbines 16, 17, 18 before being exhausted through the nozzle 19 to provide additional propulsive thrust. The high, intermediate and low-pressure turbines respectively drive the high and intermediate pressure compressors 14, 13 and the fan 12 by suitable interconnecting shafts.

The performance of gas turbine engines, whether measured in terms of efficiency or specific output, is improved by increasing the turbine gas temperature. It is therefore desirable to operate the turbines at the highest possible temperatures. For any engine cycle compression ratio or bypass ratio, increasing the turbine entry gas temperature produces more specific thrust (e.g. engine thrust per unit of air mass flow). However as turbine entry temperatures increase, the life of an un-cooled turbine falls, necessitating the development of better materials and the introduction of internal air cooling.

In modern engines, the high-pressure turbine gas temperatures are hotter than the melting point of the material of the blades and vanes, necessitating internal air cooling of these airfoil components. During its passage through the engine, the mean temperature of the gas stream decreases as power is extracted. Therefore, the need to cool the static and rotary parts of the engine structure decreases as the gas moves from the high-pressure stage(s), through the intermediate-pressure and low-pressure stages, and towards the exit nozzle.

FIG. 2 shows an isometric view of a typical single stage cooled turbine. Cooling air flows are indicated by arrows.

Internal convection and external films are the prime methods of cooling the gas path Components—airfoils, platforms, shrouds and shroud segments etc. High-pressure turbine nozzle guide vanes 31 (NGVs) consume the greatest amount of cooling air on high temperature engines. High-pressure blades 32 typically use about half of the NGV flow. The intermediate-pressure and low-pressure stages downstream of the HP turbine use progressively less cooling air.

The high-pressure turbine airfoils are cooled by using high pressure air from the compressor that has by-passed the combustor and is therefore relatively cool compared to the gas temperature. Typical cooling air temperatures are between 800 and 1000 K, while gas temperatures can be in excess of 2100 K.

The cooling air from the compressor that is used to cool the hot turbine components is not used fully to extract work from the turbine. Therefore, as extracting coolant flow has an adverse effect on the engine operating efficiency, it is important to use the cooling air effectively.

Ever increasing gas temperature levels combined with a drive towards flatter combustion radial profiles, in the interests of reduced combustor emissions, have resulted in an increase in local gas temperature experienced by the extremities of the blades and vanes, and the working gas annulus endwalls.

This has led to the concept of a shroudless turbine, where the shroud is eliminated (or substantially reduced), allowing a better management of cooling flow in response to a flatter temperature profile, and a reduction in loading on the disc due to a reduction of parasitic mass.

In an enshrouded turbine, the turbine consists of a disc, rotating about the central shaft of the engine, and a plurality of blades extending radially out from the disc towards the engine casing of the engine. Expansion through the turbine causes its blades to rotate at high speed. The blades of the turbine rotate closely to, and within, an annular assembly of seal segments that form a seal segment ring around the tips of the turbine blades.

As the disc and the blades of the turbine rotate, they are subject to considerable centrifugal force and temperatures. The centrifugal force and high temperature cause the turbine to extend in the radial direction and this can cause "rubbing" as the tips of the blades come into contact with the seal segments.

As the turbine rotates, the distance between the tips of the blades and the seal segments is known as the tip clearance. It is desirable for the tips of the turbine blades to rotate as close to the seal segments without rubbing as possible because as the tip clearance increases, the efficiency of the turbine decreases, as a portion of the expanded gas flow will pass through the tip clearance. This is known as over-tip leakage.

Steps have been taken in order to minimise the over tip leakage. Currently some engines are fitted with an abradable coating on the inside of the seal segment, against which the blades can rub. This means that the blades will cut a groove in this lining, to form a seal against the casing.

Conventionally, the seal segment is cooled by impingement. Coolant is contained within an annular duct formed by the inner wall of the engine casing and the outer surface of the ring seal segments, which impinges the coolant onto the back face of the seal segment inner wall. This method requires a large flow of coolant to sufficiently cool the abradable layer and keep it at an acceptable temperature due to the thermal resistance of the seal segment wall between the coolant and the radially inner surface of the abradable material.

Another approach to cooling is effusion cooling. Coolant is discharged from an outboard annular duct through one or more very small diameter radial ducts, which extend through the seal segment and abradable coating. The coolant can therefore cool the seal segment and abradable coating, being in direct contact with both of these components, and finally be impinged on the turbine blade tips.

GB2009329A describes a turbine wheel shroud of porous abradable material, incorporating transverse, non-porous, divisions to prevent axial flow losses of the cooling air along the length of the shroud.

SUMMARY OF THE INVENTION

A general aim of aspects of the invention is to provide a means for effusion cooling a seal segment incorporating an abrasive coating.

Another general aim of aspects of the invention is to provide a means of stopping abraded material blocking the effusion ducts.

In one aspect the invention provides a turbine casing assembly, comprising an annular seal segment assembly for surrounding the turbine adjacent to the turbine blades; an abradable coating on the inboard surface of the seal segments of the seal segment assembly; one or more coolant ducts extending from the outboard surface of a respective seal segment through the seal segment and abradable coating for carrying a coolant towards the blade tips; and, one or more annular grooves formed in the inboard surface of the abradable coating, the or each coolant duct opening into one of the one or more annular grooves.

The coolant ducts may extend in a substantially radial direction, or at an angle to the radial direction.

The annular grooves may extend circumferentially or at an angle to the circumference around the inboard surface of the abradable coating.

The grooves may be of any suitable cross section, although preferably the mouth of each groove opening towards the blades is no narrower than the inner end of the groove (furthest from the blade). Suitable cross sections include a rectangular or trapezoidal cross section.

In some embodiments, the grooves extend continuously from one edge of the seal segment to another edge of the seal segment. Alternatively, some or all of the grooves may terminate in end walls within the perimeter of the seal segment. In this way air entrained in a groove can be forced inwards, by an end wall of the groove, towards the blade tips. The end walls of the grooves may be radiused to have a concave shape to encourage this flow of air.

Conveniently, a bond layer material may be present between the abradable coating and the inboard surface of the seal segment. Preferably, this bond layer is formed from a material with a thermal expansion coefficient value that falls between the thermal coefficient values of the seal segment and abradable lining respectively. Preferably, this bond layer comprises zirconia.

In a second aspect the invention provides a method for the effusive cooling of a seal segment assembly of a turbine, within a turbine casing, comprising passing a coolant through one or more ducts, from the outboard edge of the seal segment assembly, towards the turbine blades, each of the one or more ducts passing through a seal segment of the seal segment assembly and an abradable coating and opening towards the turbine, wherein one or more annular grooves are formed in the inboard surface of the abradable coating, the or each coolant duct opening into one of the one or more annular grooves; and, effusing the coolant from the duct towards the turbine; whereby, any abraded coating can pass into the grooves, so as not to obstruct the ducts.

In a third aspect the invention provides a turbine assembly, comprising a turbine having a plurality of radially extending blades, an annular seal segment assembly surrounding the turbine adjacent to the tips of the turbine blades, the seal segment assembly comprising as plurality of seal segments; an abradable coating on the inboard surface of each seal segment; one or more coolant ducts extending from the outboard edge of the seal segment through the seal segment and abradable coating, for carrying a coolant towards the blade tips; and, one or more annular grooves formed in the inboard surface of the abradable coating, the or each coolant duct opening into one of the one or more annular grooves.

The turbine blades may have abrasive tips, for example comprising abrasive grit embedded or similarly attached to the tip of the blade.

Advantageously, the grooves in the abradable layer help to prevent material abraded from that layer blocking the effusion ducts. More specifically, the relatively large cross-section grooves (compared with the cross-section of the ducts) provide a space in which the abraded material can collect without blocking the ducts and from where it can subsequently be removed due to gas washing the seal segment surface.

BRIEF DESCRIPTION OF THE DRAWINGS

An embodiment of the invention will now be described by way of example with reference to the accompanying drawing in which:

FIG. 6 shows a plan view of the abradable coating on the seal segment of another embodiment of the invention, in which a series of discontinuous grooves in the abradable coating terminate inwardly of the perimeter of the seal segment; and FIG. 7 shows a cross section along line A-A in FIG. 6.

DETAILED DESCRIPTION

Figure 1:
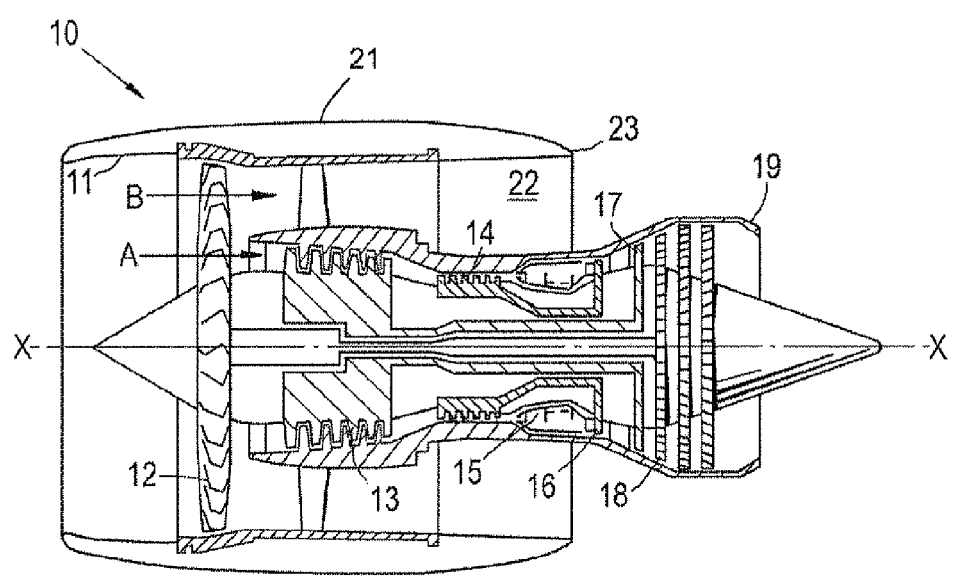
FIG. 1 shows a section through a typical ducted fan gas turbine engine.
Figure 2:
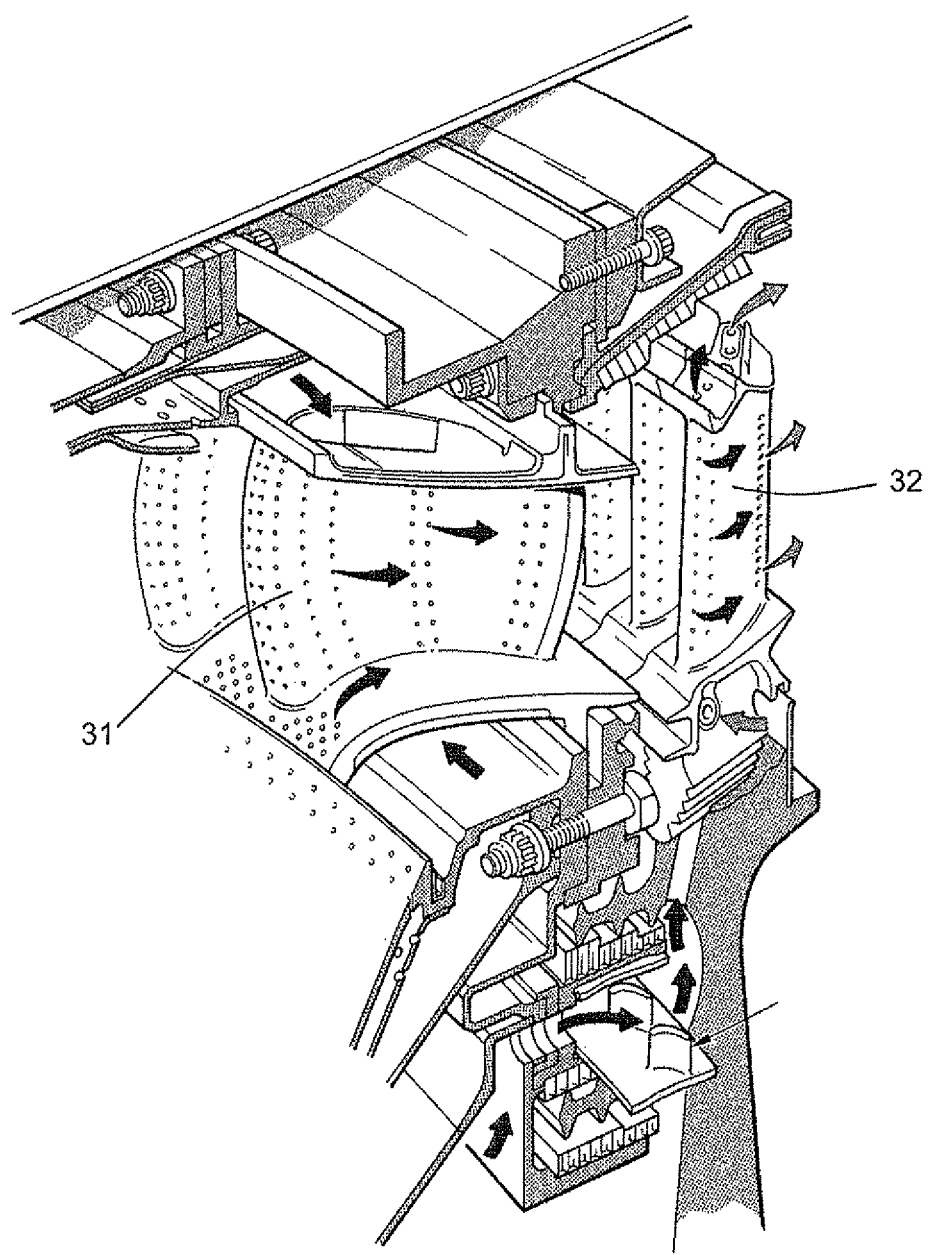
FIG. 2 shows an isometric view of a typical single stage cooled turbine.
Figure 3:
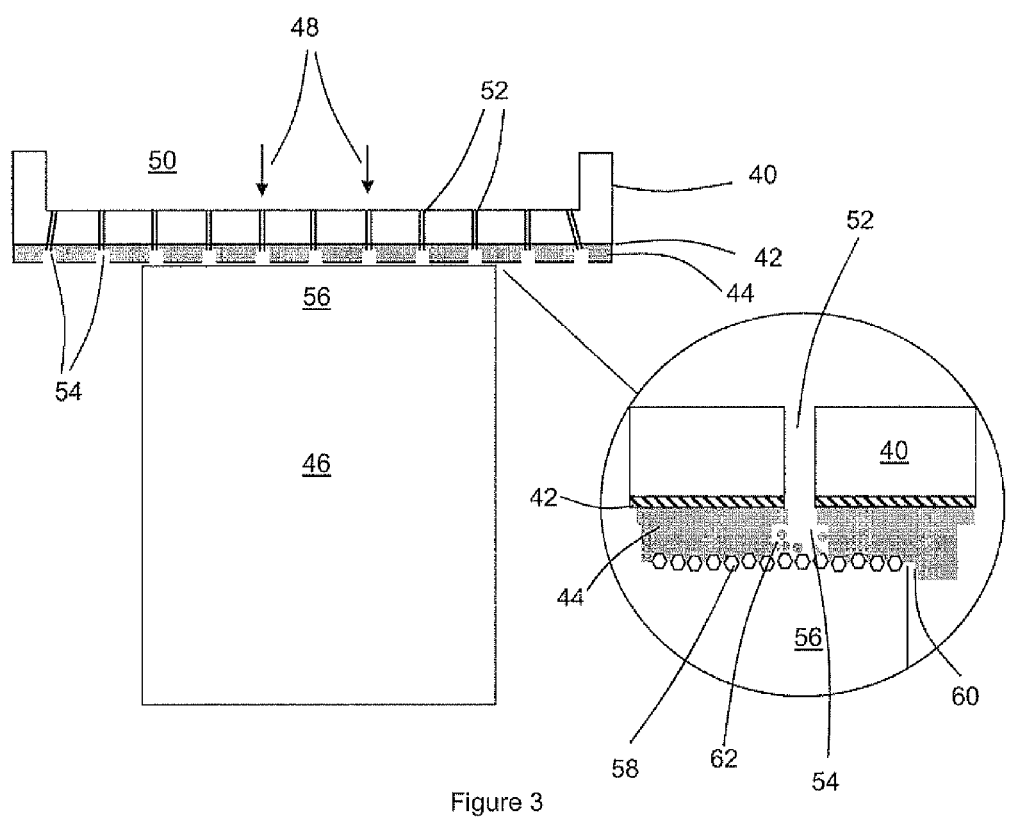
FIG. 3 shows a side elevation of a turbine housing according to an embodiment of the present invention, having rectangular cross section grooves in an abradable coating on an inner surface of a seal segment.

FIG. 3 shows a side elevation of a seal segment 40 of a seal segment ring of a gas turbine in accordance with an embodiment of the present invention. A bond interlayer 42 bonds an abradable coating layer 44 to the radially inner surface of the seal segment 40. The seal segment ring surrounds the tips of turbine blades 46, which rotate within the seal segment 40 assembly.

Coolant is effused 48 from the outboard side 50 of the seal segment 40 through a series of effusion ducts 52, which extend through the seal segment 40, bond interlayer 42 and abradable coating 44 towards the turbine blades 46. The effusion ducts 52 open into one or more grooves 54, which are provided in the inboard surface of the abradable coating 44. The grooves 54 are longitudinal and extend circumferentially around the seal segment so as to form annular grooves 54. The grooves 54 lie in a parallel orientation relative to one another and to the edge of the circumferential edge of the segment. The dimensions, spacing and cross-section of the grooves is determined by the cooling requirements and what is deemed necessary for preventing a build up of material in use.

In one embodiment, the thickness of abradable liner is between 3 mm and 5 mm. The groove 54 depth may be between 2 mm and 3 mm to allow for rubs from the blades. It will be appreciated that this will allow a rub up to approximately 2 mm. The expected grit size may be between 0.1-0.2 mm but may be larger or smaller depending on the application. The width of the grooves may be up to 1.5 mm. The holes may be up to 1 mm in diameter.

The tips 56 of the turbine blades 46 incorporate an abrasive material 58. As the blades rotate, these abrasive tips 56 will cut a slight groove 60 into the inboard surface of the abradable coating layer 44 to form a minimal tip clearance between the abradable layer 44 and the blade tips 56.

The bond interlayer 42, which may comprise zirconia, has a thermal expansion coefficient between that of the seal segment 40 and the abradable material 44. This means that as the seal segment 40, bond interlayer 42 and abradable layer 44 expand and contract, due to heating and cooling, the effects of 'thermal mismatch' will be ameliorated.

As the blades 46 rotate and the abrasive material 58 at the tips 56 abrade the inboard surface of the abradable layer 44, some of the abraded material 62 will be released into the grooves 54 from where it is removed by gas washing. The grooves 54 are of sufficiently large cross-section that they will not be blocked by abraded material 62 which flows into them before it is washed away.

By this process, blocking of the effusion ducts 52 by the abraded material 62 is avoided, whereas without the grooves 54 blocking of the effusion ducts 52 would be very likely to occur.

Figure 4:
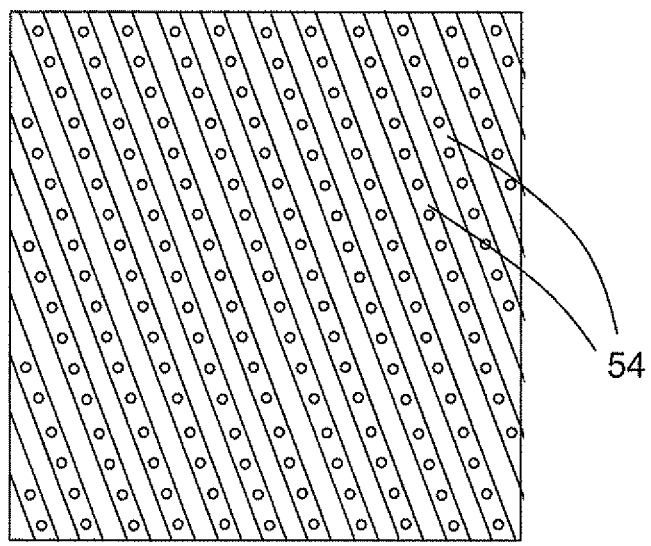
FIG. 4 shows, on an enlarged scale, a partial view an alternative embodiment in which the grooves in the abradable coating have a trapezoidal cross section.

The grooves 54 may be circumferential around the inboard surface of the abradable layer 44, or may be at an angle to the circumferential direction, as seen in FIG. 4. In this case, the grooves predominantly extend in a circumferential direction but extend laterally across the segments, in an axial direction relative to the principal direction of rotation of the blades, from one side of the segment to the other. The angle of incidence with the rotational path of the blades may be up to 50 degrees.

Figure 5:
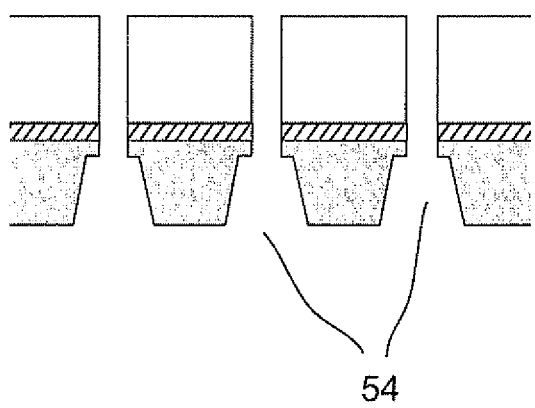
FIG. 5 shows a plan view of the abradable coating on the seal segment

The grooves 54 may be of rectangular cross section as seen in FIG. 3, or any other suitable cross section, for example of trapezoidal cross section, as shown in FIG. 5. That is, the grooves may diverge as they extend through the abradable liner towards the outboard surface.

Advantageously, when the grooves 54 are of trapezoidal cross section, the initial touches by the blade tips 56 will remove less abradable material 44 than subsequent touches, which will produce less friction and subsequently, less excess heat.

In the embodiment illustrated in FIG. 4, the grooves 54 are continuous from one edge of the seal segment 40 to another edge of the seal segment 40. FIGS. 6 and 7 show an alternative embodiment in which the grooves 54' are discontinuous and stop short of the edges of the seal segment 40. More specifically, an array of grooves 54' are formed in the surface of the abradable layer 44 on the inboard surface of the seal segment 40. In this example the grooves 54' are arranged in a regular pattern, in rows of longitudinally aligned grooves 54', with the grooves 54' of one row being off-set longitudinally from the grooves of adjacent rows.

One or more effusion ducts 52 open into each groove 54'.

The end walls 64 of each groove 54' are radiused to provide a smooth, concave shape, to turn entrained air inwards towards the blade tips 56, as indicated by arrow 66.

The seal segments described above can be produced by coating the seal segment 40 with an abradable layer 44 and then machining the grooves 54 in-situ around the inboard surface of the abradable layer. The effusion ducts 52 can then be drilled through the abradable layer 44, within the grooves 54, and through the seal segment 40.

Alternatively, the effusion ducts 52 can be drilled in the seal segment 40 prior to coating the inboard surface with the abradable layer. The holes can then be masked off on the inboard side of the seal segment and the abradable layer 44 applied. The masking can then be removed to reveal the holes on the inboard side of the seal segment 40, through the abradable layer 44. The grooves 54 can then be machined in-situ, such that the holes exit into said grooves.

While the invention has been described in conjunction with the exemplary embodiment described above, many equivalent modifications and variations will be apparent to those skilled in the art when given this disclosure. Accordingly, the exemplary embodiment of the invention set forth above is considered to be illustrative and not limiting. Various changes to the described embodiment may be made without departing from the spirit and scope of the invention.

The invention claimed is:

1. An annular seal assembly configured, in use, to surround a turbine adjacent to turbine blades of the turbine, the annular seal assembly comprising a plurality of seal segments;
   each of the plurality of seal segments of the annular seal assembly having an abradable coating on an inboard surface thereof, the abradable coating arranged, in use, for contact with tips of the turbine blades and having an axially upstream edge and an axially downstream edge;
   a plurality of rows of effusion cooling ducts extending from an outboard surface of a respective seal segment of the plurality of seal segments, through the respective seal segment and the abradable coating;
   each effusion cooling duct of the plurality of rows of effusion cooling ducts opening into one of a plurality of grooves formed in an inboard surface of the abradable coating, each of the grooves in the plurality of grooves extending predominantly in a circumferential direction around the annular seal assembly, a mouth of each groove of the plurality of grooves opening towards the turbine blades not being narrower than an inner end of the groove and the plurality of grooves lying in a parallel orientation relative to one another in an array which extends from the axially upstream edge to the axially downstream edge.

2. The annular seal assembly according to claim 1, wherein the effusion cooling ducts extend in a substantially radial direction relative to the rotational axis of the turbine in use.

3. The annular seal assembly according to claim 1, wherein the effusion cooling ducts extend at an angle to the radial direction relative to the rotational axis of the turbine in use.

4. The annular seal assembly according to claim 1, wherein the plurality of grooves extend at an angle to the circumferential direction around the inboard surface of the abradable coating, wherein the angle is between 0 and 50 degrees.

5. The annular seal assembly according to claim 1, wherein the plurality of grooves have a rectangular cross section.

6. The annular seal assembly according to claim 1, wherein the plurality of grooves are of trapezoidal cross section.

7. The annular seal assembly according to claim 1 wherein at least one of the plurality of grooves terminates in end walls within a perimeter of the abradable coating of a seal segment.

8. The annular seal assembly according to claim 7, wherein at least one end wall of the at least one of the plurality of grooves is radiused to have a concave shape.

9. The annular seal assembly according to claim 1, wherein the grooves of the plurality of grooves are arcuate and are arranged in circumferentially extending rows around the seal assembly.

10. The annular seal assembly according to claim 1, wherein a bond layer material is present between the abradable coating and the inboard surface of the plurality of seal segments.

11. The annular seal assembly according to claim 10, wherein the bond layer comprises zirconia.

12. The annular seal assembly according to claim 1, wherein each of the plurality of grooves has a depth into the abradable coating that is less than a thickness of the abradable coating.

13. A method for effusive cooling of turbine blades and an annular seal having segments, within a gas turbine casing of a gas turbine, comprising:
   passing a coolant through a plurality of rows of effusion cooling ducts, from an outboard edge of the seal segment, towards the turbine blades, the effusion cooling ducts each passing through a seal segment and an abradable coating and opening towards the gas turbine, the abradable coating having an axially upstream edge and an axially downstream edge, wherein a plurality of grooves are formed in an inboard surface of the abradable coating, each of the one or more effusion cooling ducts opening into a groove; and
   effusing the coolant from the effusion cooling ducts towards the turbine; whereby, any abraded coating can pass into the grooves, so as not to obstruct the effusion cooling ducts, the grooves extending predominantly in a circumferential direction around the annular seal assembly and substantially in parallel with one another in an array which extends from the axially upstream edge to the axially downstream edge and wherein the mouth of each groove opening towards the blades is no narrower than the inner end of the grooves and the grooves lying in a parallel orientation relative to one another.

14. The method according to claim 13, wherein each of the plurality of grooves has a depth into the abradable coating that is less than a thickness of the abradable coating.

15. A gas turbine assembly, comprising:
   a turbine having a plurality of radially extending turbine blades,
   an annular seal segment assembly surrounding the turbine adjacent to the tips of the turbine blades, the seal assembly comprising a plurality of seal segments;
   an abradable coating on an inboard surface of each seal segment, the abradable coating having an axially upstream edge and an axially downstream edge;
   one or more effusion cooling ducts extending from an outboard surface of the seal segment assembly through a respective seal segment and the abradable coating on the seal segment, for carrying a coolant towards the blade tips; and,
   a plurality of grooves formed in an inboard surface of the abradable coating, each effusion cooling duct opening into a groove, the grooves extending predominantly in a circumferential direction around the annular seal assembly and the mouth of each groove opening towards the blades is no narrower than the inner end of the grooves and the grooves lying in a parallel orientation relative to one another in an array which extends from the axially upstream edge to the axially downstream edge.

16. The gas turbine assembly according to claim 15, wherein at least one of the turbine blades has an abrasive tip.

17. The gas turbine assembly according to claim 15, wherein each of the plurality of grooves has a depth into the abradable coating that is less than a thickness of the abradable coating.

* * * * *